United States Patent
Van Gheluwe et al.

(10) Patent No.: US 11,054,108 B2
(45) Date of Patent: Jul. 6, 2021

(54) ADJUSTABLE SPOT LIGHT POSITION GENERATION

(71) Applicant: SIGNIFY HOLDING B.V., Eindhoven (NL)

(72) Inventors: Jochen Renaat Van Gheluwe, Lommel (BE); Oliver Dross, Waalre (NL); Anthonie Hendrik Bergman, Nuenen (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/478,057

(22) PCT Filed: Dec. 22, 2017

(86) PCT No.: PCT/EP2017/084349
§ 371 (c)(1),
(2) Date: Jul. 15, 2019

(87) PCT Pub. No.: WO2018/134028
PCT Pub. Date: Jul. 26, 2018

(65) Prior Publication Data
US 2020/0124247 A1    Apr. 23, 2020

(30) Foreign Application Priority Data
Jan. 17, 2017    (EP) .................................. 17151840

(51) Int. Cl.
*F21V 5/00*       (2018.01)
*G02B 27/09*      (2006.01)
(Continued)

(52) U.S. Cl.
CPC .......... *F21V 5/008* (2013.01); *G02B 27/0922* (2013.01); *G02B 27/0955* (2013.01);
(Continued)

(58) Field of Classification Search
None
See application file for complete search history.

(56) References Cited

U.S. PATENT DOCUMENTS 6,796,690 B2    9/2004   Bohlander
9,218,669 B1   12/2015   Golan et al.
(Continued)

FOREIGN PATENT DOCUMENTS

CN    102177448 A    9/2011
CN    202012853 U   10/2011
(Continued)

*Primary Examiner* — Ashok Patel
(74) *Attorney, Agent, or Firm* — Daniel J. Piotrowski

(57) ABSTRACT

Disclosed is a lighting device (1) for generating a dynamically adjustable spotlight without moving parts. The lighting device comprises a planar array of individually addressable sets of light sources (11), each set comprising at least one light source, each of said light sources being arranged to produce a luminous distribution; a controller (20) arranged to individually address said sets of light sources; and an optical system (100) comprising a plurality of refractive lenses (110, 120, 130) common to the individually addressable light sources and arranged to shape the luminous distribution of each set of light sources into a spotlight (13) and project said spotlight in an angular direction that is a function of a position of said set in the array.

12 Claims, 10 Drawing Sheets

(51) Int. Cl.
  *F21Y 115/10* (2016.01)
  *F21W 131/405* (2006.01)
  *F21W 131/406* (2006.01)

(52) U.S. Cl.
  CPC . *F21W 2131/405* (2013.01); *F21W 2131/406* (2013.01); *F21Y 2115/10* (2016.08)

(56) References Cited

U.S. PATENT DOCUMENTS

| | | | |
|---|---|---|---|
| 9,328,898 | B1 | 5/2016 | Flasck |
| 9,383,077 | B2 | 7/2016 | Chang |
| 2002/0196639 | A1 | 12/2002 | Weidel |
| 2005/0225878 | A1 | 10/2005 | Tanaka et al. |
| 2008/0192359 | A1* | 8/2008 | Sohmer .............. G02B 17/0892 359/649 |
| 2008/0267527 | A1 | 10/2008 | Berretty |
| 2010/0238659 | A1 | 9/2010 | Fann |
| 2011/0080401 | A1 | 4/2011 | Tan et al. |
| 2011/0128630 | A1 | 6/2011 | Tanaka et al. |
| 2012/0050872 | A1 | 3/2012 | Ito et al. |
| 2012/0105468 | A1 | 5/2012 | Sasaki |
| 2012/0189291 | A1 | 7/2012 | Von Malm et al. |
| 2015/0160580 | A1 | 6/2015 | McAlister et al. |
| 2015/0201476 | A1 | 7/2015 | Snijder et al. |
| 2015/0211709 | A1 | 7/2015 | Uchida et al. |
| 2015/0330589 | A1 | 11/2015 | Kloos |
| 2016/0150208 | A1 | 5/2016 | Li et al. |
| 2018/0246302 | A1* | 8/2018 | Minefuji ................ G02B 13/18 |

FOREIGN PATENT DOCUMENTS

| | | |
|---|---|---|
| CN | 104214671 A | 12/2014 |
| CN | 104978722 A | 10/2015 |
| WO | 2010103477 A1 | 9/2010 |
| WO | 2011144597 A2 | 11/2011 |
| WO | 2012004760 A1 | 1/2012 |
| WO | 2012040581 A1 | 3/2012 |

* cited by examiner

ADJUSTABLE SPOT LIGHT POSITION GENERATION

CROSS-REFERENCE TO PRIOR APPLICATIONS

This application is the U.S. National Phase application under 35 U.S.C. § 371 of International Application No. PCT/EP2017/084349, filed on Dec. 22, 2017, which claims the benefit of European Patent Application No. 17151840, filed on Jan. 17, 2017. These applications are hereby incorporated by reference herein.

FIELD OF THE INVENTION

The present invention relates to a lighting device for generating a dynamically adjustable spotlight, such as a spotlight projector.

BACKGROUND OF THE INVENTION

In many application domains it is desirable to be able to remotely control the shape and/or projection location of a spotlight. Such application domains for example include retail applications, e.g. shops, entertainment applications, e.g. theatres, as well as domestic applications in which such spotlight control may increase the aesthetic appeal of a lighting application and/or increase the functionality of such a lighting application. To this end, the lighting device typically comprises a motorized component such as a motorized filter, motorized gobo wheels or other motorized optics, which motorized component is controlled to adjust the spotlight properties in a desired manner, e.g. a spotlight may be moved by controlling motorized gobo wheels accordingly. Similarly, the orientation of the lighting device housing can be adjusted using motors, thus effectively changing the direction of a beam generated with the lighting device.

A drawback of the inclusion of such motorized components in such a lighting device is that it increases its cost as well as its form factor. Moreover, such motorized components are noisy, prone to failure and therefore require regular maintenance.

Therefore, it is desirable to omit such motorized components from the lighting device. A prototype of such a lighting device has been disclosed by the Osram Company; see: https://www.osram.com/osram_com/press/press-releases/_trade_press/2016/osram-presents-lighting-innovations-at-the-light—building-preview/ as retrieved from the Internet on 3 Jan. 2017. This dome-shaped ceiling luminaire comprises 61 individually controllable light emitting diodes (LEDs) each comprising dedicated optics to shape the luminous output of the LED in a desired manner, which luminaire may be wirelessly controlled using Wi-Fi with the DMX512 protocol. The dome shape ensures that each LED is aimed in a different direction, thereby facilitating the projection of light spots in different locations of a space in which the luminaire is mounted. A drawback of this luminaire is its relative complexity owing to the dedicated optics for each LED and the need to mount each LED on a dome-shaped surface. This increases the cost of the luminaire.

U.S. Pat. No. 6,796,690B2 and WO2011144597A2 both relate to a lighting device for generating a dynamically adjustable spotlight.

SUMMARY OF THE INVENTION

The present invention seeks to provide a simpler lighting device for generating a dynamically adjustable spotlight that can be manufactured in a more cost-effective manner.

According to an aspect, there is provided a lighting device for generating a dynamically adjustable spotlight, comprising a planar array of individually addressable sets of light sources, each set comprising at least one light source, each of said light sources being arranged to produce a luminous distribution around an optical axis; a controller arranged to individually address said sets of light sources; and an optical system comprising a plurality of refractive lenses common to the individually addressable light sources and sequentially arranged along a common optical axis to shape the luminous distribution of each set of light sources into a spotlight and project said spotlight in an angular direction that is a function of a position of said set in the array.

The present invention is based on the realization that an arrangement of refractive lenses that are common to all light sources of the planar array, which light sources preferably are solid state lighting elements such as LEDs, may be used to shape the respective luminous outputs of the light sources such that each luminous output is projected in a different direction, i.e. a direction that is a function of the position of the set of light sources within the planar array. Consequently, a particularly compact lighting device is achieved that can generate dynamically adjustable spotlights in which the adjustment is not limited to spotlight position adjustment but can further include spotlight shape adjustment by intelligent addressing of one or more sets of the light sources of the lighting device. Such a lighting device may be manufactured using only a few (optical) components such that the lighting device may be manufactured in a cost-effective manner. In the context of the present application, a set of lighting devices includes at least one lighting device such that in some embodiments the planar array may comprise a plurality of individually addressable lighting devices, e.g. LEDs. Alternatively, each set of lighting devices may comprise a plurality of light sources, e.g. a spatial cluster of light sources such as LEDs for example such that an addressed cluster of light sources gives the appearance of a single light source to an observer, e.g. by generating a substantially continuous light spot.

Preferably, the optical system is arranged to change the respective angular directions of projected moving spotlights generated from luminous distributions of different neighboring light sources in a constant manner. The expression "moving spotlight" in this context has to be understood as to relate to a spotlight following a selected trajectory, and not to the (dynamic) size of a spotlight. The expression "constant manner" in this context has to be understood in relation to generate a dynamic beam, such that when said moving dynamic beam temporarily has a peak intensity located in between individual beam components, the individual components are not distinguishable, for example when dynamically displacing the light spot along a specified trajectory. The appearance of a smoothly altering or moving light spot in a constant manner may, for example, be generated with the lighting device via a diffuser comprised in the optical system causing an angular blur of the beam as generated by the optical system with a diffusion angle which is the same or slightly greater, i.e. about 10% greater, than an angular pitch generated by the optical system. In this context, 'angular pitch' denotes an angular difference between the final central light direction of a light source after imaging by the optical system and the final central light direction of a neighbouring light source in the array.

Alternatively or additionally the appearance of a smoothly moving light spot in a constant manner and in a chosen direction along a trajectory may be generated with the lighting device when during operation of the lighting device a selected set of light sources for generating a light spot has adjacent light sources to said selected set in said chosen direction that start to operate at a dimming level of which the dimming level gradually increases in the radial direction away from the centre of said selected set. Adjacent light sources of same dimming level may be formed as partial rings around the centre of said selected set of light sources indicated by an increasing ring number in a radial direction away from the centre of selected set of light sources. For example, a first partial ring, directly adjacent to said selected set may be dimmed down to result in about 30%, a second partial ring may be dimmed down to result in about 10%, and a third partial ring may be dimmed down to result in about 3% of the intensity of the light sources that generate the light spot. Another stepper stepped profile may, for example, be 100% intensity for the selected set of light sources, the first partial ring operating at about 25% intensity and the second partial ring operating at about 5% intensity. Optionally, a same gradually dimming level may be applied for light sources that are part of a trailing part of the trajectory followed by the moving spot, i.e. the light sources in the opposite radial direction to the chosen direction. Thus a change in the location of the light spot can be kept substantially constant is enabled, i.e. without substantial differences in a change in appearance between generated light spots when changing the addressed set of light sources to a set of light sources neighbouring the previously addressed set of light sources.

In an embodiment, the plurality of refractive lenses comprises a first refractive lens arranged to receive the respective luminous outputs from the array and at least one further refractive lens arranged to receive the luminous output of the first refractive lens, said first refractive lens having a lens body at least partially delimited by a planar surface facing the array and a convex surface opposite the planar surface, said lens body having a maximum height normal to the planar surface of at least the radius of the planar surface. Such an optical system provides a particularly efficient generation of the spotlight due to the high refractive power and light capture efficiency of the first refractive lens.

The at least one further refractive lens may comprise a first further refractive lens and a second further refractive lens arranged such that the first further refractive lens is positioned in between the first refractive lens and the second further refractive lens, each of the first further refractive lens and the first further refractive lens being a plano-convex lens having its planar surface facing the array in order to effectively control the angular redirection of the luminous outputs of the sets of light sources of the planar array into the desired direction of the spotlight.

In a preferred embodiment, the optical system further comprises a diffuser arranged downstream from the first refractive lens, such as between the first further refractive lens and the second further refractive lens. Such a diffuser causes a blurring of the generated spotlight, which blurring can assist in giving the appearance of a smooth transition of the spotlight between different projection locations, particularly in situations in which the diffusion power of the optical system without a diffuser is not large enough to prevent such transitions from being observed as discrete transitions, which may be aesthetically undesirable in application domains in which such a transition should be perceived as a smooth motion of the spotlight along a desired trajectory. Such blurring further ensures that, when using multiple (sets) of light sources to generate a spotlight, the resulting spot will appear homogeneous. This allows, for instance, for smooth zooming. Alternatively, at least one of the respective optical surfaces of the first refractive lens and the at least one further refractive lens is at least partially structured to diffuse said luminous distributions in order to obtain this desired blurring.

It is not necessary for the at least one further refractive lens to comprise a pair of plano-convex lenses. Alternatively, the at least one further refractive lens comprises a double-convex refractive lens having a first convex surface facing the first refractive lens and a second convex surface opposite the first convex surface. This has the advantage of even fewer optical components in the lighting device.

In such a double-convex refractive lens, a maximum height of the first convex surface is preferably smaller than a maximum height of the second convex surface when measured from a virtual plane dissecting (i.e. in between) the first convex surface and the second convex surface in order to maximize the optical efficiency as the lowest curvature surface faces the first refractive lens, thereby improving its light capturing efficiency.

In an embodiment, the first refractive lens has a first diameter and the at least one further refractive lens has a second diameter larger than the first diameter, the first diameter being larger than a diameter of the array. This ensures that substantially all light generated by the respective sets of light sources is captured by the optical system.

In a further embodiment, at least some of the respective optical surfaces of the first refractive lens and the at least one further refractive lens are coated with an anti-reflective coating. Such coatings reduce the Fresnel reflections at the interfaces of the lens surfaces, thereby improving the optical efficiency of the optical system.

In some scenarios, a luminous distribution generated with a set of light sources axially displaced relative to the optical axis of the optical system (i.e. off-centre sets of light sources) can cause the generation of a ghost image by the optical system when imaging such a luminous distribution. Such ghost images typically are the result from internal reflections within the first refractive lens in particular. In applications where the generation of such a ghost image may be aesthetically undesirable, the lighting device further may be configured to suppress the generation of such a ghost image.

In an example embodiment, at least a central portion of the convex surface of the first refractive lens is covered with the anti-reflective coating, said central portion covering at least 50% of the convex surface. It has been found that such an anti-reflective coating, e.g. a multilayer coating of alternating high and low refractive index materials, can cause destructive interference in light rays that are internally reflected within the first refractive lens without significantly affecting light rays that are refracted by the lens. This further has the advantage of suppressing Fresnel reflections at the convex surface interface as previously explained.

In another example embodiment, the maximum height normal to the planar surface of the first refractive lens is 1.1 to 1.3 times the radius of the planar surface of this lens. This causes the focal point of light rays undergoing Fresnel reflection to be located considerably above a virtual plane comprising the light sources, which causes the peak intensity of the ghost image to be significantly reduced compared to a semi-spherical first refractive lens. In other words, due to the ghost image being spread over a larger area by such a first refractive lens, the ghost image becomes less noticeable.

In yet another example embodiment, the controller is adapted to calculate a location and luminance of a ghost image of a selected set of light sources for generating a spotlight and to control further sets of light sources of the array to generate a region of background illumination for said spotlight enveloping the ghost image such that the combination of the region and the ghost image has a defined luminance. The defined luminance may be a constant luminance or a radially decreasing luminance in a direction away from the ghost image. In this manner, the ghost image is blended into a background illumination, which leads to the ghost image being less noticeable or even not at all noticeable, thereby improving the aesthetic performance of the lighting device.

The lighting device may further comprise at least one of a user interface and a wireless communication module to which the controller is responsive in order to facilitate control of the lighting device. For example, in case of a wireless communication module to which the controller is responsive, a remote controller may be used to wirelessly communicate with the lighting device through the wireless communication module. Such a remote controller may be a dedicated remote controller or an electronic device configured with an app or the like to implement the remote control functionality on the electronic device. Such an electronic device for example may be a portable electronic device such as a smart phone, tablet computer, laptop or the like although it should be understood that any suitable electronic device may be contemplated for this purpose.

BRIEF DESCRIPTION OF THE DRAWINGS

Embodiments of the invention are described in more detail and by way of non-limiting examples with reference to the accompanying drawings, wherein.

DETAILED DESCRIPTION OF THE EMBODIMENTS

Figure 1:
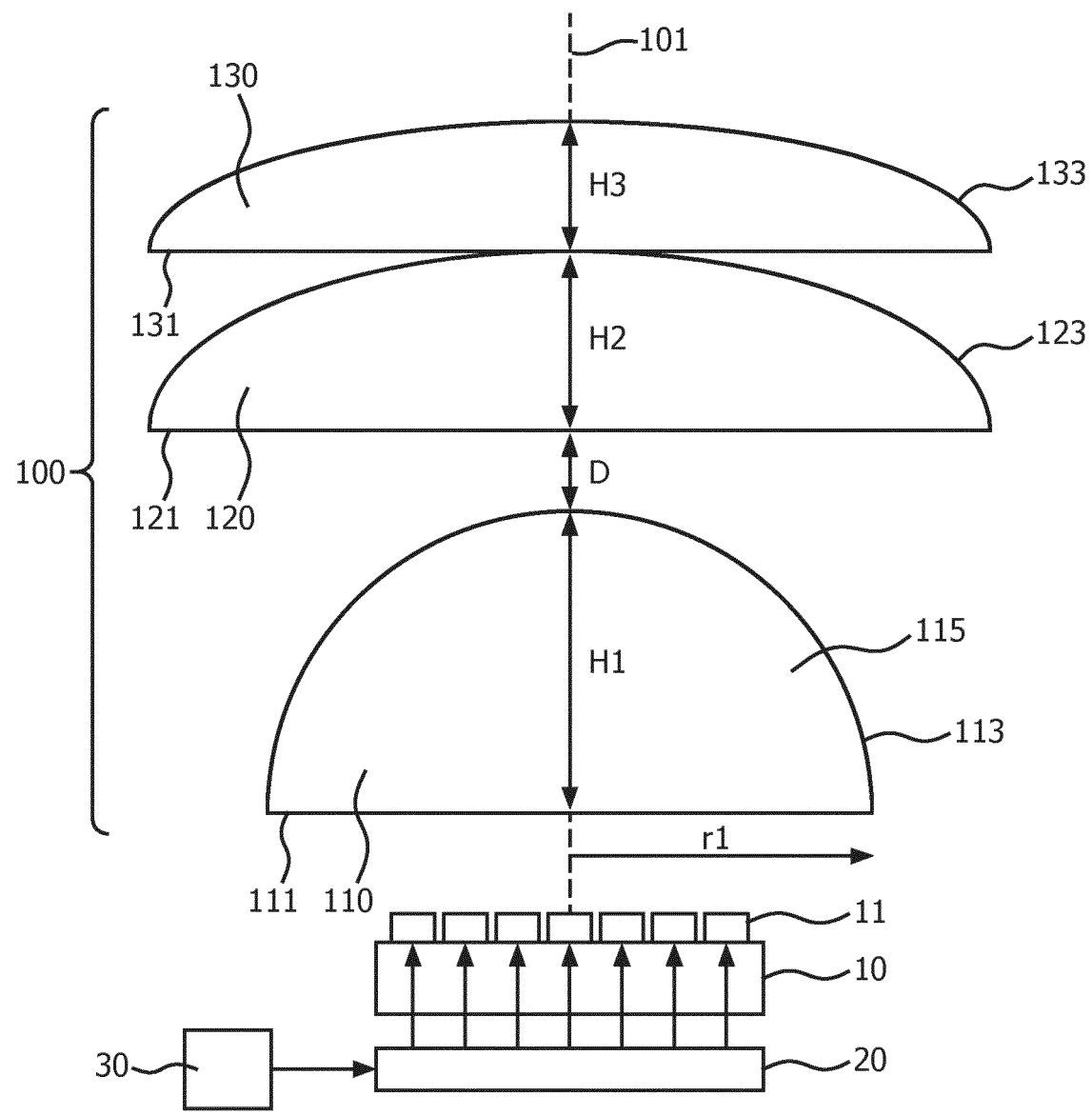
FIG. 1 schematically depicts a lighting device according to an embodiment.

It should be understood that the Figures are merely schematic and are not drawn to scale. It should also be understood that the same reference numerals are used throughout the Figures to indicate the same or similar parts.

FIG. 1 schematically depicts a lighting device 1 according to an embodiment of the present invention. The lighting device 1 comprises a plurality of light sources 11 arranged in a planar array; in other words, each light source 11 is arranged to generate a luminous distribution along an optical axis, wherein the respective optical axes of the light sources 11 are aligned. In the context of the present application it should be understood that small deviations from a perfectly planar array are acceptable; for example, the array may be positioned on a slightly curved surface such that an angular spread of the angles between respective optical axes of the light sources 11 does not exceed 5°.

The light sources 11 preferably are solid-state light sources such as LEDs. The light sources 11 may be identical light sources, e.g. white light LEDs, or may be different light sources, e.g. different colour LEDs. The light sources 11 may be mounted on any suitable carrier 10 such as a printed circuit board or the like. Any suitable type of light sources 11 may be used for this purpose. Each light source 11 is controlled, i.e. addressed, by a controller 20. The controller 20 may take any suitable form, such as a dedicated controller or microcontroller or a suitable processor programmed to implement the control functionality. The controller 20 may be adapted to individually address each light source 11 or may be adapted to address clusters of light sources 11. In the context of the present application, both scenarios will be referred to as the controller 20 being adapted to address a set of light sources 11, wherein the set may have only a single member (i.e. the controller 20 is adapted to address individual light sources 11) or wherein the set may have multiple members (i.e. the controller 20 is adapted to address clusters of light sources 11). In an embodiment, the light sources 11 may be arranged in clusters within the array, with each cluster defining a group of light sources 11 arranged to generate light of different colours. The light sources 11 in each cluster for example may be placed within a mixing chamber, e.g. a white mixing chamber, or may be placed underneath mixing light guide such as a glass square or PMMA rod, to generate light of a desired spectral composition. In this embodiment, the controller 20 may be adapted to address individual light sources 11 within single clusters such that the controller 20 may change the colour of the light generated by the cluster. In the above embodiments, the addressing of the light sources 11 with the controller 20 may include switching the light sources 11 between an on-state and an off-state and changing a dimming level of the light sources 11.

The controller 20 is responsive to a user instruction receiver 30, which user instruction receiver 30 may include at least one of a user interface on the lighting device 1 and a wireless communication module for wirelessly receiving user instructions from a remote controller. The user interface on the lighting device 1 may take any suitable shape, e.g. a touchscreen interface, one or more dials, sliders, buttons, switches or the like or any combination thereof. The wireless communication module may take any suitable shape and may be configured to communicate with the remote controller using any suitable wireless communication protocol, such as for example Bluetooth, Wi-Fi, a mobile communication standard such as UMTS, 3G, 4G, 5G or the like, a near field communication protocol, a proprietary communication protocol and so on. The remote controller may be a dedicated remote controller that for example is provided with the lighting device 1 or alternatively may be any suitable electronic device adapted for wireless communication that may be configured to act as the remote controller, for example by installing an app or similar software program on the electronic device, which app or software program may be provided with the lighting device 1 or may be retrieved from a network-accessible repository such as an app store over the network, e.g. the Internet. A user of the lighting device 1 in this manner may provide instructions of dynamically adjusting the luminous output of the lighting device 1, which instructions are translated by the controller 20 into addressing signals for addressing selected sets, i.e. one or more sets, of the light sources 11 in order to generate the luminous outputs corresponding to the user instructions.

The lighting device 1 is adapted to convert the luminous distributions of the addressed light sources 11 into a spotlight (i.e. a light spot) for projection onto a surface, which surface for example may be a shop floor, theatre stage or seating area, a pedestrian walkway, a floor, wall or ceiling of a room in a house, and so on. In a preferred embodiment, the lighting device 1 is a spotlight projector. The controller 20 responsive to the user instruction receiver 30 facilitates the dynamic adjustment of the spotlight in response to received user instructions (or in response to a pre-programmed adjustment program) such that the lighting device 1 can create an aesthetically pleasing and interesting light effect. Such a dynamic adjustment may include the displacement of the spotlight on the surface on which it is projected although embodiments of the present invention are not limited to spotlight migration. Spotlight adjustments may further include adjustment of the colour of the spotlight, the shape of the spotlight or any combination of these adjustments, for example to attract attention of observers of the spotlight, e.g. shoppers, visitors of an illuminated display space such as a museum, and so on. It is further noted for the avoidance of doubt that the lighting device 1 may be adapted to simultaneously create multiple spotlights, with the position of each spotlight being independently dynamically adjustable as will be readily understood by the skilled person.

Advantageously, the lighting device 1 does not require any moving (motorized) parts to implement the dynamic adjustment of the spotlight created with the lighting device 1 by the addressing of selected sets of light sources 11 with the controller 20 as previously explained. This is achieved by the provision of an optical system 100 common to all the sets of light sources 11, which optical system 100 is arranged to receive the respective luminous distributions produced by the light sources 11 and to shape these respective luminous distributions into a spotlight having a shape and position determined by the specific set(s) of light sources 11 addressed (enabled) by the controller 20. More specifically, the optical system 100 is adapted to project the spotlight in an angular direction relative to its optical axis 101 that is a function of the position of the addressed set of light sources 11 within the array of light sources 11.

To this end, the optical system 100 comprises a plurality of refractive lenses including a first refractive lens 110 arranged to collect the respective luminous distributions produced by the light sources 11 and at least one further refractive lens 120 arranged to collect the light exiting the first refractive lens 110. In the embodiment schematically depicted in FIG. 1, the optical system 100 comprises three plano-convex lenses 110, 120, 130 each having their planar light entry surfaces 111, 121, 131 facing the array of light sources 11 and having convex light exit surfaces 113, 123, 133 opposing their respective light entry surfaces. The plano-convex lenses 110, 120, 130 preferably are rotationally symmetric around a shared optical axis 101 and each may be made of any suitable material, e.g. glass or an optical grade polymer such as polycarbonate, poly (methyl methacrylate) (PMMA), polyethylene terephthalate, and so on. The respective lenses 110, 120, 130 may be made of the same material or of different materials, e.g. to tune the refractive index of the respective lenses 110, 120, 130.

The refractive lenses 110, 120, 130 are typically arranged to reduce the beam spread angle of the respective luminous distributions generated with the light sources 11, i.e. to increase the degree of collimation of these respective luminous distributions in order to convert these luminous distributions into a light beam with a high degree of collimation such that the luminous output of the optical system 100 takes the shape of a spotlight when projected into the far field, i.e. at a distance several orders of magnitude greater than the focal length of the optical system 100, such as for example at a distance of 1 m, several metres or more. This is explained in more detail with the aid of FIG. 2, in which the optical function as implemented by the optical system 100 is schematically depicted.

Figure 2:
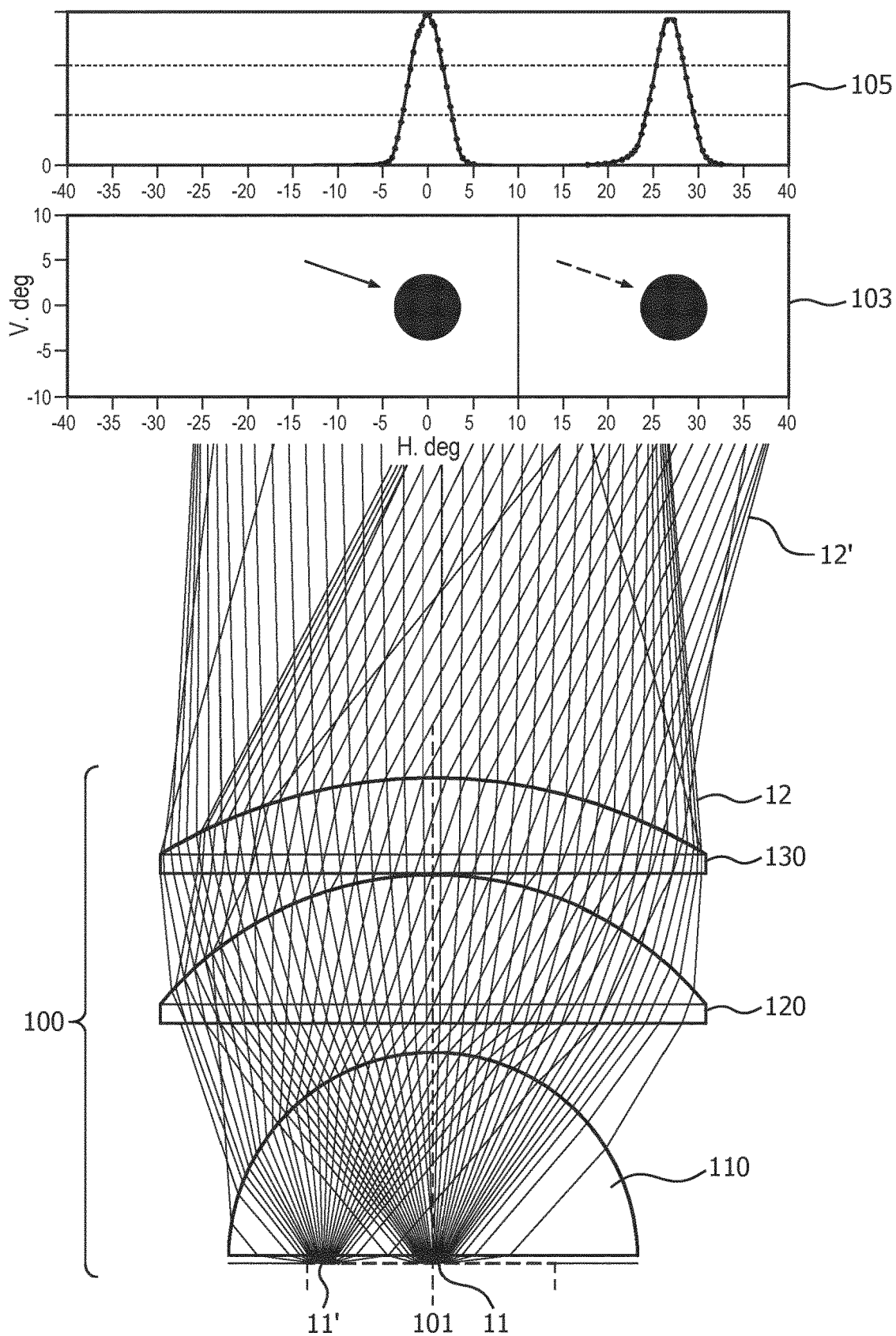
FIG. 2 schematically depicts the optical functionality of a lighting device according to an embodiment.

As can be seen in FIG. 2, the optical system 100 images the luminous distribution of the light sources 11 as a function of the position of the light source 11 relative to the optical axis 101 of the optical system 100, as exemplified by a first light source 11 positioned on the optical axis 101 having its luminous distribution 12 shaped (collimated) along the optical axis 101, with a second light source 11' being axially displaced relative to the optical axis 101 having its luminous distribution 12' shaped (collimated) under a non-zero angle with the optical axis 101, with the magnitude of this angle being a function of the amount of axial displacement of the light source 11 relative to the optical axis 101. The luminous distribution 12 leads to the projection of a first spotlight as indicated by the solid arrow in the pane 103 along the optical axis 101 whereas the luminous distribution 12' leads to the projection of a second spotlight as indicated by the dashed arrow in the pane 103 that is axially displaced relative to the optical axis 101. The pane 105 depicts the luminous intensity distributions of the respective spotlights in the pane 103. In this manner, by addressing selected sets of light sources 11 based on their position in the array relative to the optical axis 101, the projection direction of the spotlight generated with the optical system 100 may be controlled.

The first refractive lens 110 preferably has a height H1 of at least 0.9 times its radius r1, in order to achieve a sufficiently high refractive power of this first refractive lens. In an embodiment, the height H1 equals the radius r1, i.e. the first refractive lens 110 is a hemispherical lens. If the height H1 would be less than 0.9 times the radius r1, the refractive power of the first refractive lens 110 would be diminish, thereby putting higher demands on the refractive power of downstream lenses of the optical system 100, which would require an increase in the size of such downstream lenses, thereby increasing the overall size of the optical system 100 and reducing its efficiency. In a further preferred embodiment, the height H1 does not exceed 1.3 times the radius r1 in order to limit the amount of internal reflection within the first refractive lens 110, which internal reflection reduces the optical efficiency of the lens.

The first refractive lens 110 preferably has a diameter (2*r1) that is larger than the diameter or largest cross-section of the array of light sources 11 such that the first refractive lens 110 can collect substantially all light emitted by the light sources 11 independent of the position of the light sources 11 within the array. For this reason, the planar light entry surface 111 of the first refractive lens 110 preferably is positioned as close as possible to the array of light sources 11 to maximize the optical efficiency of the optical system 100, although a small gap between the planar light entry surface 111 of the first refractive lens 110 and the array of light sources 11 may be present, e.g. a gap of about 1 mm. This gap preferably does not exceed the pitch of the light sources 11 in the array and more preferably is less than or equal to half this pitch.

Due to the fact that the light distribution exiting the first refractive lens 110 through its convex light exit surface 113 still is divergent (although to a lesser degree than the luminous distribution of the light produced by the light sources 11), the one or more refractive lenses 120, 130 have a larger diameter than the first refractive lens 110 in order to harvest substantially all light exiting the first refractive lens 110. The first further refractive lens 120 may be separated from the first refractive lens 110 by a spacing or a gap having a dimension D, which dimension D may be based on the radius r1 of the first refractive lens 110. For example, the dimension D may be up to about 0.30*r1, e.g. a spacing or gap in a range of about 6-8 mm for a first refractive lens 110 having a radius r1 of 30 mm, although alternatively this spacing or gap may be absent, i.e. the light entry surface 121 of the first further refractive lens 120 may contact the light exit surface 113 of the first refractive lens 110. The respective lenses of the optical system 100 may be spherical or aspherical. The respective heights H2, H3 of the first further refractive lens 120 and, if present, the second further refractive lens 130 may be optimized in accordance with the position of these lenses within the optical system 100 and the desired optical function of the optical system 100 as will be readily understood by a skilled person.

Figure 3:
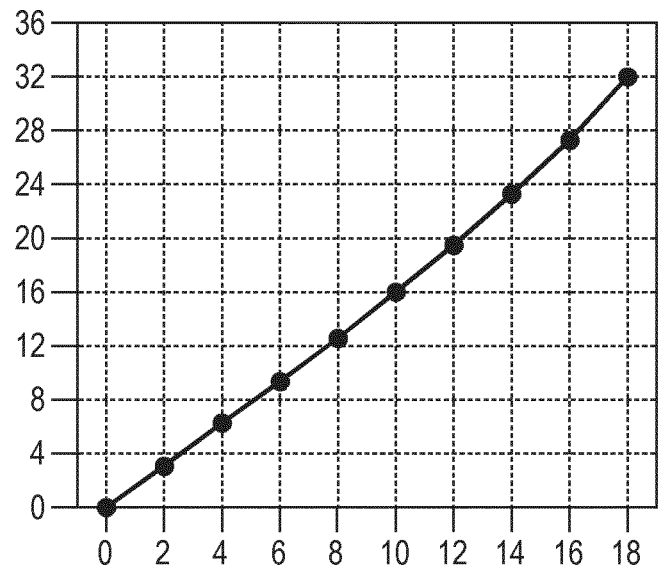
FIG. 3 is a graph depicting the angle between an optical axis of the optical system and the direction in which spotlight is projected by the lighting device according to an embodiment as a function of light source position.

The spatial resolution of the array of light sources 11 is determined by the pitch of the light sources 11 in the array. This spatial resolution is associated with the angular resolution, i.e. 'angular pitch', in the final light distribution as determined by the optical system 100. In this context, 'angular pitch' denotes the angular difference between the final central light direction of a light source 11 after imaging by the optical system 100 as previously explained and the final central light direction of a neighbouring light source 11 in the array. This angular pitch preferably is approximately constant over the total angular range of the lighting device 1, as schematically depicted in FIG. 3, which depicts the angle between the optical axis 101 and the final central light direction of a light source 11 as a function of the axial displacement (in mm) of the light source 11 relative to the optical axis 101. In other words, the angular pitch on the optical axis of the spotlight 12 is about the same as the angular pitch at the outer angular range of the spot as illustrated in FIG. 3.

Figure 4:
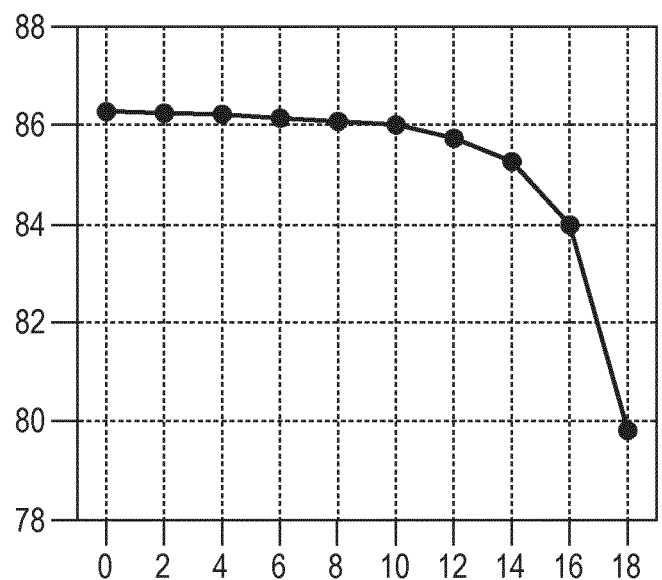
FIG. 4 is a graph depicting the optical efficiency of the lighting device as a function of light source position.

FIG. 4 depicts the optical efficiency (%) of the generated spotlights as a function of the axial displacement (in mm) of the light source 11 relative to the optical axis 101, which demonstrates that a relatively constant spotlight intensity can be generated across a large range of axial displacements of the light sources 11 relative to the optical axis 101.

In order to enable a smooth (non-discrete) apparent movement of a spotlight 12, the angular blur of the optical system 100 should have a diffusion angle greater than the angular pitch generated by the optical system 100. In other words, by intelligently controlling the intensity of the light sources 11 it is possible to generate a beam with a peak intensity located in between individual beam components, whereby the individual components are not distinguishable, e.g. when dynamically displacing the spotlight 12 along a specified trajectory. Another way of looking at this is that there should be sufficient overlap between spotlights originating from neighbouring light sources 11 in the array such that the sequential addressing of such neighbouring light sources 11 gives the appearance of a smoothly transitioning spotlight 12 across a surface on which this spotlight is projected.

This may be expressed formulaically as follows. If the angular magnification A of the optical system 100 is approximately constant, a light source at an axial displacement r from the optical axis 101 will be imaged by the optical system 100 under an angle θ, or:

$$\theta = A \cdot r$$

If p is the spatial pitch of the array of light sources 11, this translates into an angular pitch $\theta_p$:

$$\theta_p = A \cdot p$$

The angular blur (diffusion) $\Phi_{diff}$ of the optical system 100 must be greater than this angular pitch in order to create the desired overlap between spotlights of neighbouring light sources 11 in the array:

$$\Phi_{diff} > A \cdot p$$

Note that this clearly links the spatial pitch p of the array of light sources 11 to the required diffusion. The angular blur of the optical system 100 is determined by its constituent optical elements, e.g. refractive lenses 110, 120, 130 and by the size (dimension) of the light sources 11, as larger pixel sizes result in larger blur as will be readily understood by the skilled person.

Figure 5:
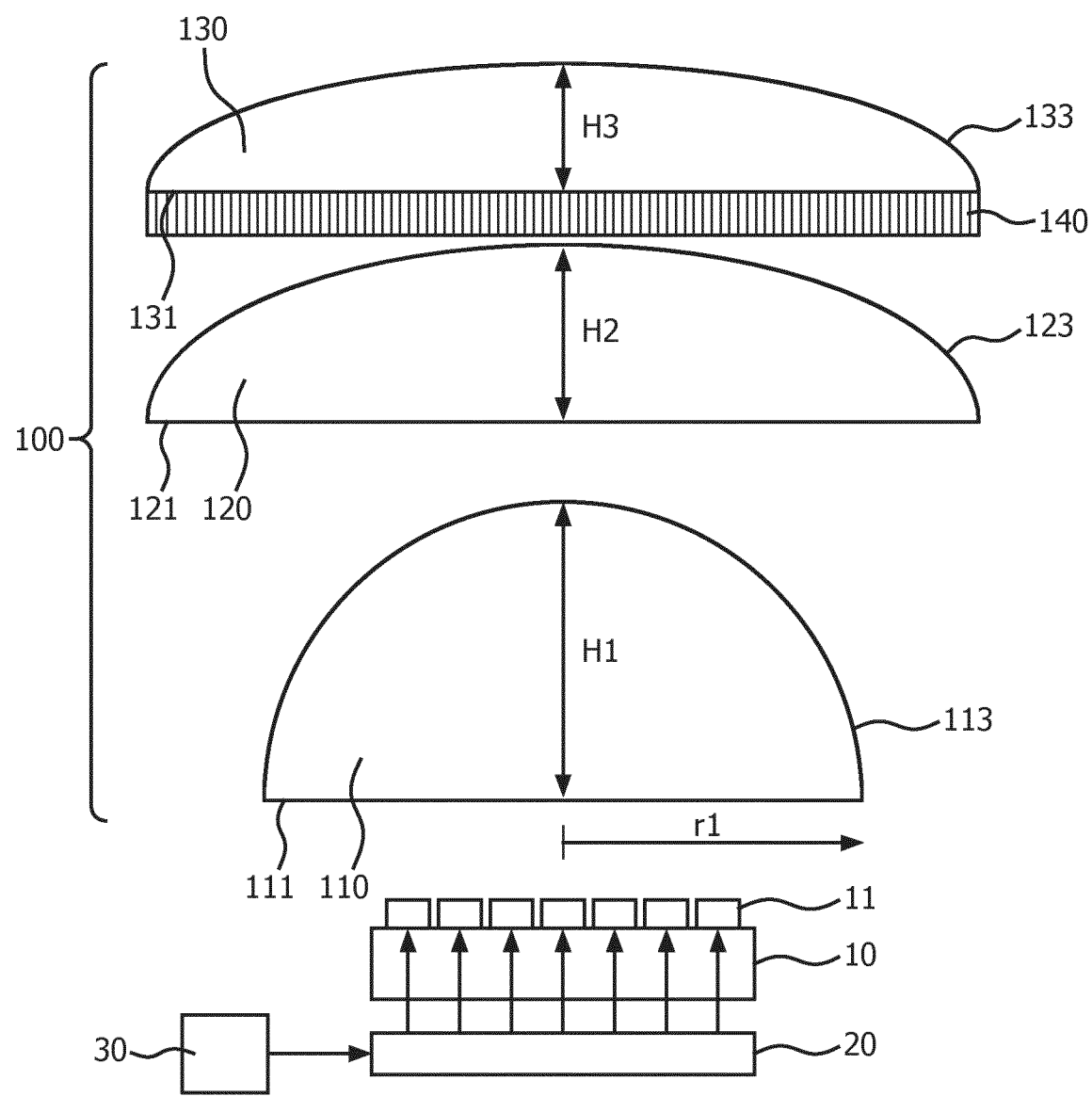
FIG. 5 schematically depicts a lighting device according to another embodiment.

The optical system 100 may comprise one or more elements for introducing additional blurring of the respective luminous distributions of the light sources 11 imaged by the optical system 100. For example, at least some of the light entry surfaces and light exit surfaces of the respective refractive lenses 110, 120, 130 may be structured, e.g. faceted or textured, in order to introduce such blurring into the optical system 100. Alternatively, as schematically depicted in FIG. 5, the optical system 100 may include a diffuser 140, here positioned in between the first further refractive lens 120 and the second further refractive lens 130 to introduce such blurring. It should be understood that such a diffuser 140 may be positioned in any suitable location within the optical system 100, e.g. in between the first refractive lens 110 and the first further refractive lens 120 or downstream from the second further refractive lens 130. Any suitable diffuser 140 may be used for this purpose. The optical system 100 may comprise multiple diffusers 140, each of which may be positioned in any suitable location downstream from the first refractive lens 110 as explained above. For the sake of completeness, it will be readily understood that the term 'downstream' is used in relation to the direction of the light emitted by the light sources 11, i.e. it equates to 'at increased distance from the light sources 11'.

Figure 6:
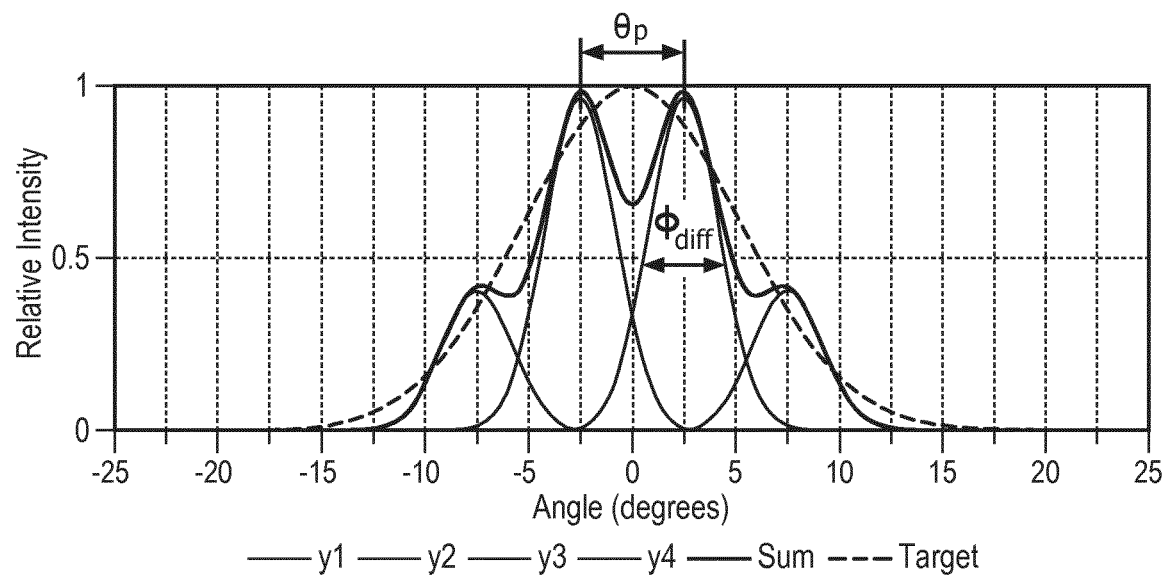
FIG. 6 graphically depicts the optical effect of the diffuser in the lighting device of FIG. 5.
Figure 6:
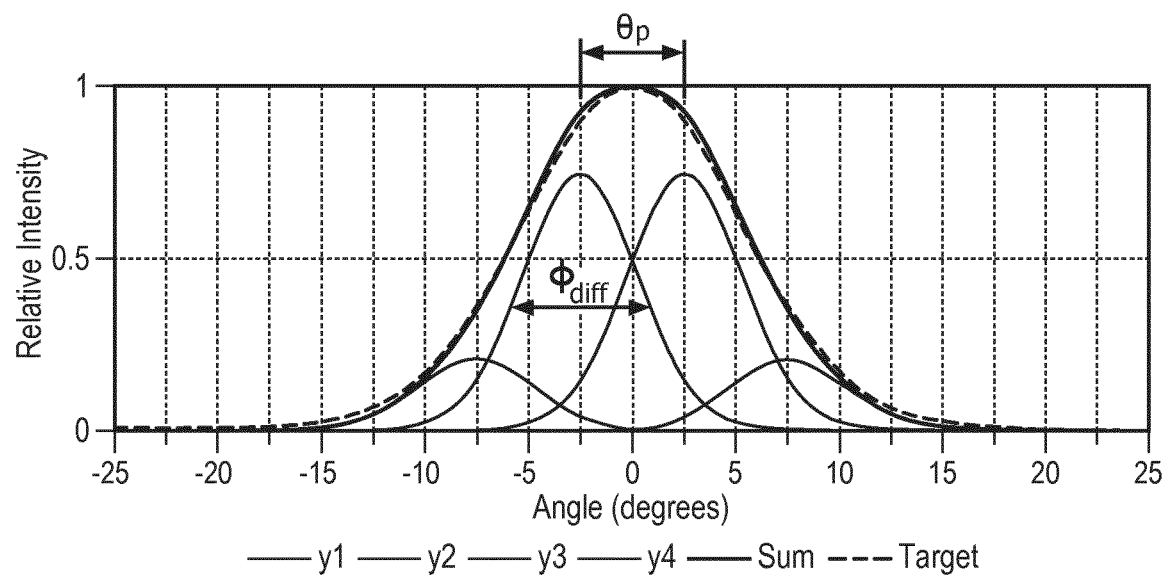

The effect of such blurring as introduced by one or more structured surfaces is schematically depicted in FIG. 6, which depicts a 2D case with four angular light sources 11 with an angular pitch 5° without additional blurring measures (top pane) and with additional blurring measures (bottom pane) in the optical system 100. As can be seen in the top pane, the angular diffusion $\Phi_{diff}$ of the optical system 100 is insufficient to create an effective envelope around the peak luminous intensities of the individual spotlights 12 such that switching between these spotlights is seen as discrete movement, whereas the increased angular diffusion $\Phi_{diff}$ of the optical system 100 in the bottom pane introduced by the blurring measures make the individual components or pixels indistinguishable, such that switching between neighbouring spotlights is observed as a continuous movement in this scenario. Similarly, as previously explained, such blurring also ensures that a spotlight formed by multiple spatially separated light sources 11 has a homogeneous appearance, which for example facilitates seamless zooming of the spotlight by changing the number of light sources 11 enabled to form the spotlight, e.g. by disabling or enabling light sources 11 defining the periphery of the spotlight.

Figure 7:
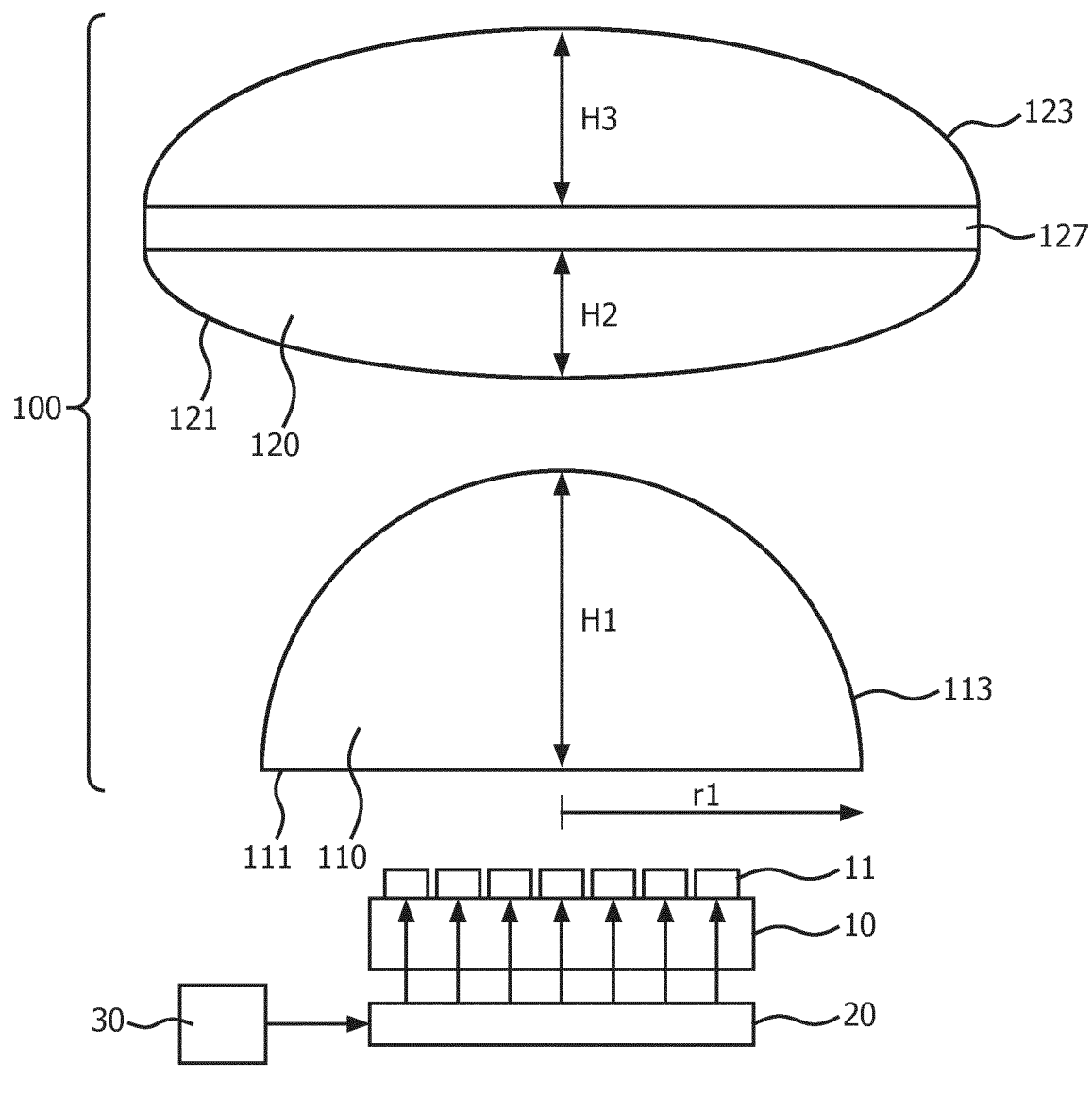
FIG. 7 schematically depicts a lighting device according to yet another embodiment.

At this point, it is noted that the optical system 100 is not necessarily limited to a system of three plano-convex lenses. For example, as schematically depicted in FIG. 7, the first further plano-convex refractive lens 120 and the second further plano-convex refractive lens 130 may be combined into a single refractive lens 120 having opposing convex surfaces 121 and 123, i.e. the single refractive lens 120 may be a double-convex lens, thereby further reducing the number of optical components of the optical system 100. A cylindrical section 127 optionally may be present between the two convex surfaces 121, 123 to illustrate that the refractive lens 120 may have any suitable shape. For example, the single refractive lens 120 may be spherical or aspherical. The height H2 of the convex light entry surface 121 of the refractive lens 120 may be smaller than the height H3 of the convex light exit surface 123 of the refractive lens 120 in order to achieve the desired optical performance of the refractive lens 120.

Similarly, the first refractive lens 110 may not be hemispherical but may have a height H1 exceeding its radius r1, e.g. by adjusting the curvature of the convex light exit surface 113 or by adding a cylindrical section (not shown) to the planar light entry surface 111. As will be explained in further detail below, in some scenarios, a first refractive lens 110 designed such that H1>r1 may be advantageous in terms of ghost image suppression. Other design variations to the optical system 100 will be immediately apparent to the skilled person. For example, the respective light entry surfaces of the respective lenses such as the first refractive lens 110 may be slightly curved rather than planar although this is not preferred in particular for the first refractive lens 110 as it would increase the distance between the light entry surface 111 and the outermost light sources 11 in the array of light sources 11, which may reduce the optical efficiency of the optical system 100 due to the fact that a smaller portion of the luminous distribution of such outermost light sources 11 is harvested by the first refractive lens 110.

Figure 8:
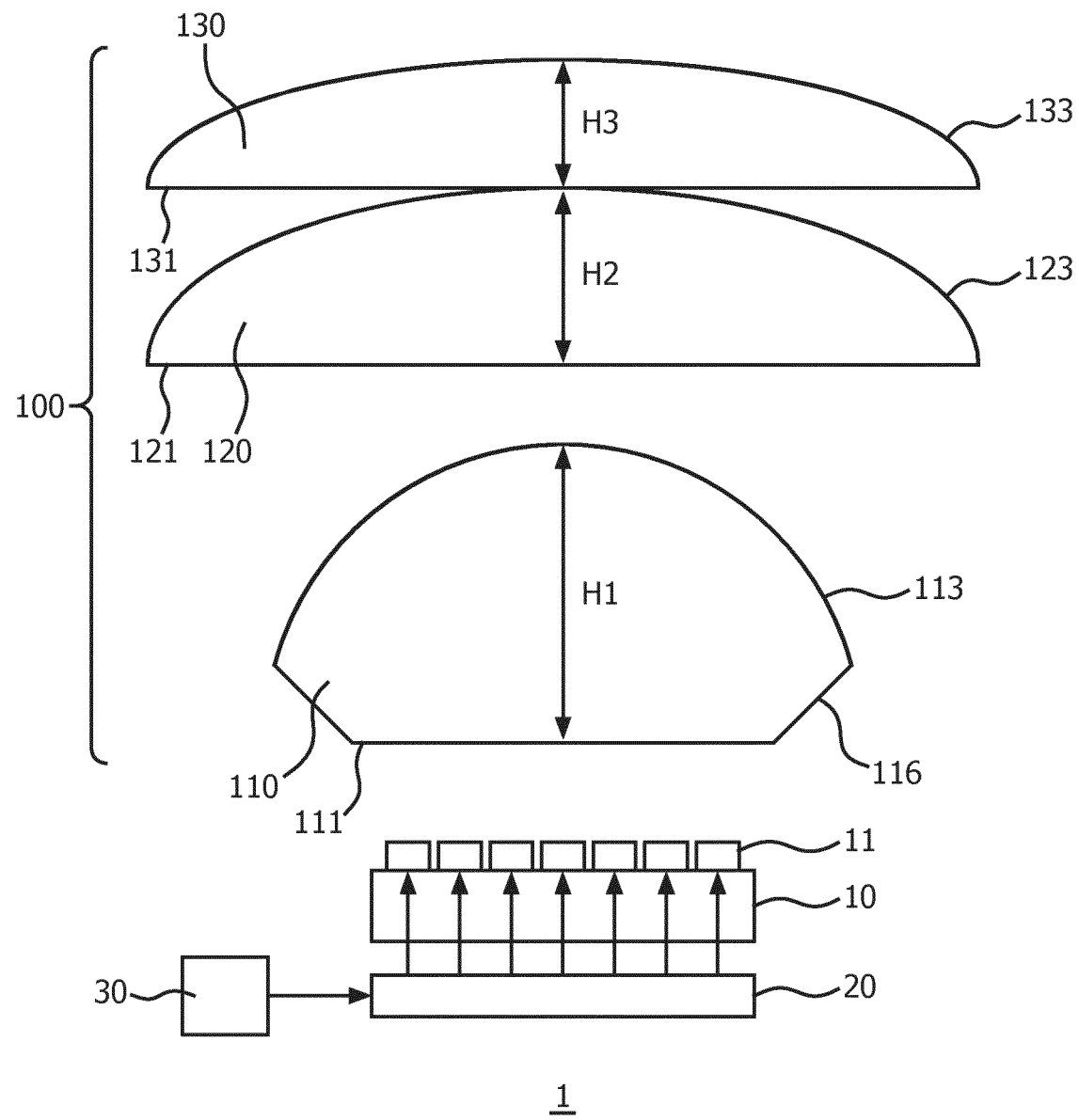
FIG. 8 schematically depicts a lighting device according to yet another embodiment.

Another example modification of the optical system 100 is schematically depicted in FIG. 8, in which the first refractive lens 110 comprises a slanted or truncated edge 116 between the light entry surface 111 and the convex light exit surface 113 in order to reduce the amount of material in the first refractive lens 110, thereby reducing its manufacturing cost. Such a truncated edge 116 may further aid the release of the first refractive lens 110 from a mould or the like in which the lens is manufactured. Such a truncation may be performed without negatively impacting the optical performance of the first refractive lens 110 given that the edge region of this lens is not optically active within the optical system 100.

Figure 9:
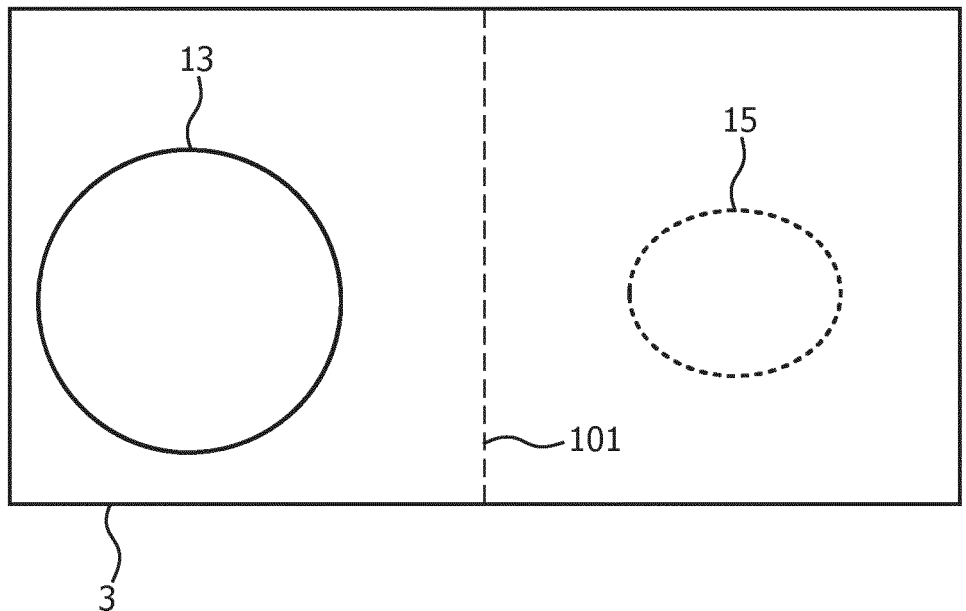
FIG. 9 schematically depicts an optical artefact that may be generated by a lighting device according to at least some embodiments in some scenarios.
Figure 10:
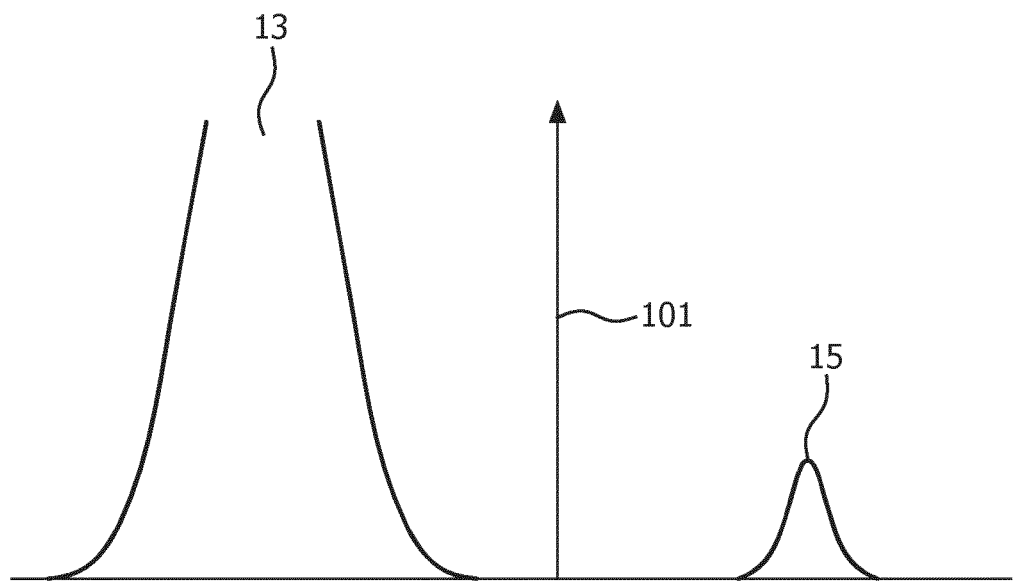
FIG. 10 schematically depicts the intensity of this optical artefact relative to the intensity of the spotlight generated with the lighting device.

In the above described embodiments of the lighting device 1 and the optical system 100 in particular, it will be apparent that the respective luminous distributions of the light sources 11 traverse several interfaces between media of different refractive indices (e.g. lens material-air interfaces), which may result in optical losses due to Fresnel reflections at these interfaces. Such optical losses may be reduced by the application of an anti-reflective coating on at least some of the respective optical surfaces of the optical system 100 at such interfaces, e.g. the respective optical surfaces of the first refractive lens 110 and the at least one further refractive lens 120, 130. Such an anti-reflective coating preferably is at least anti-reflective in the visible wavelength range, e.g. in a range of 400-700 nm.

Where the first refractive lens 110 of the optical system 100 has a spherical light exit surface 113, the Fresnel reflections at this surface can cause the generation of a ghost image in the luminous output of the lighting device 1 when addressing light sources 11 that are axially displaced relative to the optical axis 101 of the optical system 100. This is schematically depicted in FIG. 9, where a spotlight 13 generated under a non-zero angle with the optical axis 101 as previously explained and projected onto a surface 3 can cause the projection of a ghost image 15 in a mirrored location relative to the optical axis 101 on the surface 3, i.e. a ghost image 15 projected under a mirror-imaged projection angle compared to the projection angle of the spotlight 13. This can be understood by these Fresnel reflections being reflected back towards the array of light sources 11, were these reflections are reflected back towards the first refractive lens 110 and/or these reflections cause the generation of a secondary light source by excitation of a phosphor layer of a light source 11 onto which the reflections are incident, causing this secondary light source to be imaged by the first refractive lens 110, thereby giving rise to the ghost image 15. As schematically depicted in FIG. 10, although such a ghost image 15 has a much lower luminous intensity than the primary spotlight 13, e.g. luminous intensity of 1% or less of the primary spotlight 13 depending on the axial displacement of the activated light source 11 relative to the optical axis 101, such a ghost image 15 may however become conspicuous in particular when the spotlight 13 is being moved by intelligent addressing of the sets of light sources 11 as previously explained. This is highly undesirable from an aesthetic point of view, as it may draw attention away from the intended region of the surface 3 illuminated by the spotlight 13. Therefore, it is desirable to suppress or eliminate such Fresnel reflections or alternatively to obscure the ghost image 15.

In a first embodiment, such Fresnel reflections may be suppressed by shaping the first refractive lens 110 such that the lens has a spherical cap as defined by the convex light exit surface 113 having a height H1 in a range of 1.1 to 1.3 times the radius of the spherical cap at the horizontal plane, e.g. the radius r1. Preferably, the ratio between H1 and the radius of the spherical cap is 1.1333. As previously explained, this shape of the first refractive lens 110 may be achieved by altering the curvature of the convex light exit surface 113 or by the addition of a cylindrical segment below the spherical cap. Shaping the first refractive lens 110 in this manner causes the focal point of the Fresnel reflected light rays at the interface between the convex light exit surface 113 and the air to lie substantially above the array of light sources 11, such that they are not imaged by the array in a concentrated area. Consequently, the ghost image 15 is smeared out over a larger area with a reduced peak luminous intensity (luminance) and a smooth fall-off of the ghost image 15 at its perimeter, such that the ghost image 15 becomes considerably less conspicuous.

Figure 11:
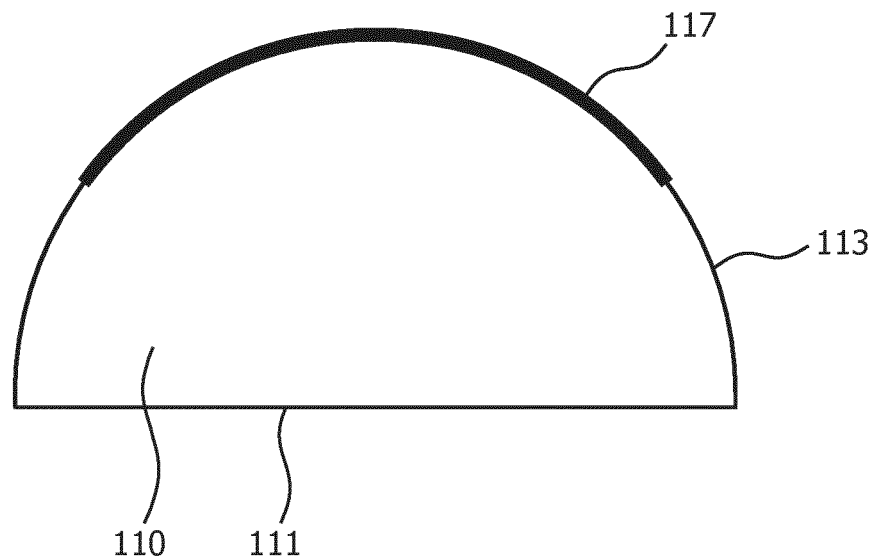
FIG. 11 schematically depicts an aspect of a lighting device according to a further embodiment configured to suppress such optical artefacts.
Figure 12:
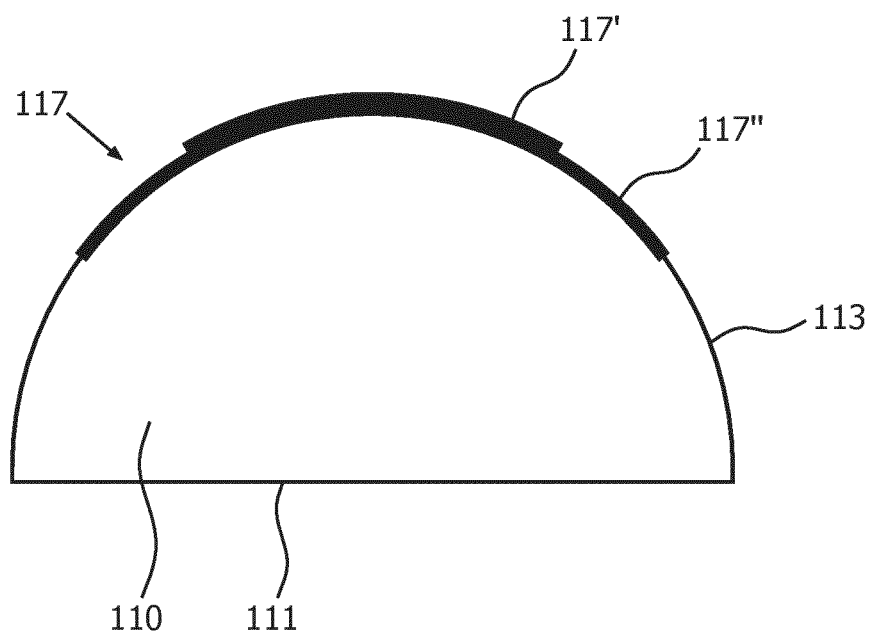
FIG. 12 schematically depicts an aspect of a lighting device according to a still further embodiment configured to suppress such optical artefacts.

Alternatively or additionally, an area of at least 50% of the total area of the convex light exit surface 113 of the first refractive lens 110, which area is centred around the optical axis 101, is coated with an anti-reflective coating 117 as schematically depicted in FIG. 11 to suppress the occurrence of such Fresnel reflections. Preferably, the anti-reflective coating 117 covers an area of at least 75% of the total area of the convex light exit surface 113 and more preferably covers the entire area of the convex light exit surface 113. The anti-reflective coating 117 may be a single layer interference coating, a gradient index anti-reflective coating, a nano-structured anti-reflective coating such as a moth eye coating, and so on. Any suitable anti-reflective coating 117 may be used for this purpose. The anti-reflective coating 117 preferably is active over a broad spectral range such as the visible spectrum extending from 400 nm to 700 nm. To this end, the anti-reflective coating 117 may be a multi-layer coating as schematically depicted in FIG. 12. Such a multi-layer anti-reflective coating 117 typically comprises an alternating layer stack of low refractive index material layers 117' and high refractive index material layers 117" as is well-known per se. It is noted that a (non-absorbing) anti-reflective coating 117 also improves the optical efficiency of the optical system 100 as losses due to Fresnel reflections are reduced.

In a further embodiment, which may be combined with any of the embodiments for suppressing ghost image detectability explained above if so desired, the controller 20 is adapted to calculate a location and (peak) luminance of the ghost image 15 resulting from the selection of one or more selected set of (axially displaced) light sources 11 for generating the spotlight 13. The controller 20 may calculate the location and (peak) luminance of the ghost image 15 from the control instructions received via the user instruction receiver 30 using a priori knowledge of the optical behaviour of the lighting device 1 and the optical system 100 in particular, which knowledge for example may be programmed into the controller 20, e.g. the controller 20 may store simulation results of the optical behaviour of the optical system 100, which simulation results indicate the approximate location and peak luminance of the ghost image 15 resulting from a particular set of light sources 11 being addressed. Instead of using simulated results, actually measured results may be used instead, which measured results for example may be obtained during factory calibration of the lighting device 1. Alternatively, the approximate location and peak luminance of the ghost image 15 may be calculated by the controller 20 in real time based on a model of the optical behaviour of the optical system 100.

Figure 13:
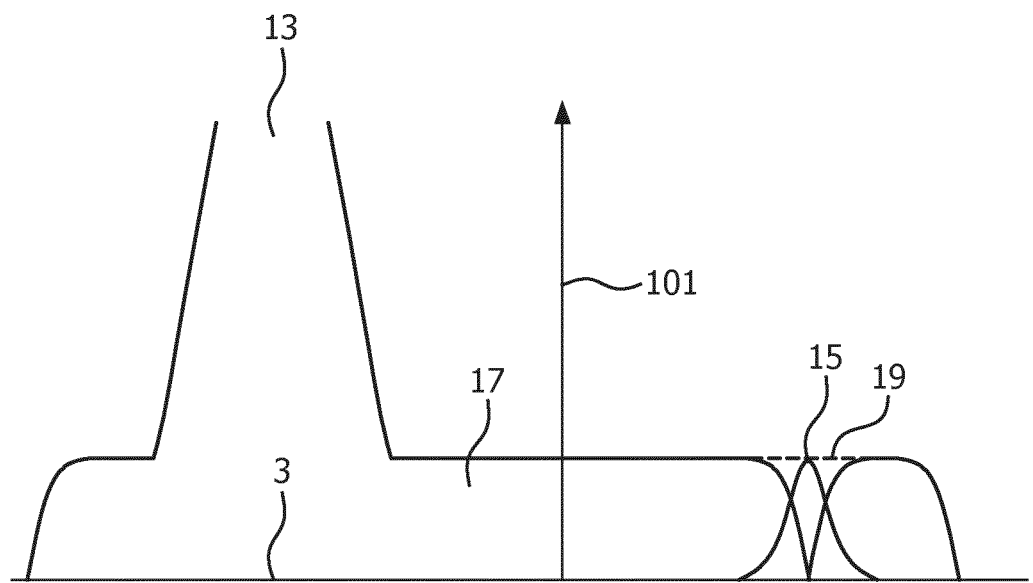
FIG. 13 schematically depicts luminous output generated with a lighting device according to yet a further embodiment configured to mask such optical artefacts.

The controller 20 is further adapted to subsequently map the obtained location and peak luminance of the ghost image 15 onto the array of light sources 11 in order to determine which light sources 11 when addressed by the controller 20 would cause the location of the ghost image 15 to be at least partially illuminated by such light sources 11. The controller 20 is further adapted to address a selection of sets of light sources 11 in order to generate a region of background illumination 17 for the spotlight 13 as schematically depicted in FIG. 13, which schematically depicts the luminance across the surface 3 onto which the spotlight 13 and the ghost image 15 are projected. The background illumination 17 has a luminance approximately equaling the peak luminance of the ghost image 15, which may be achieved by the controller 20 controlling a dimming level of the selected set of light sources 11 for generating the background illumination 17. As will be apparent to the skilled person, the selected set of light sources 11 for generating the background illumination 17 typically excludes the light sources 11 addressed by the controller 20 for generating the spotlight 13 as well as the light sources 11 when addressed by the controller 20 would cause the location of the ghost image 15 to be at least partially illuminated by such light sources 11, such that the background illumination envelopes the ghost image 15, i.e. the luminance across the region of the surface 3 on which the background illumination is created and the region of the surface 3 onto which the ghost image 15 is projected remains relatively constant as schematically depicted by luminance level 19, thereby obscuring the ghost image 15.

Figure 14:
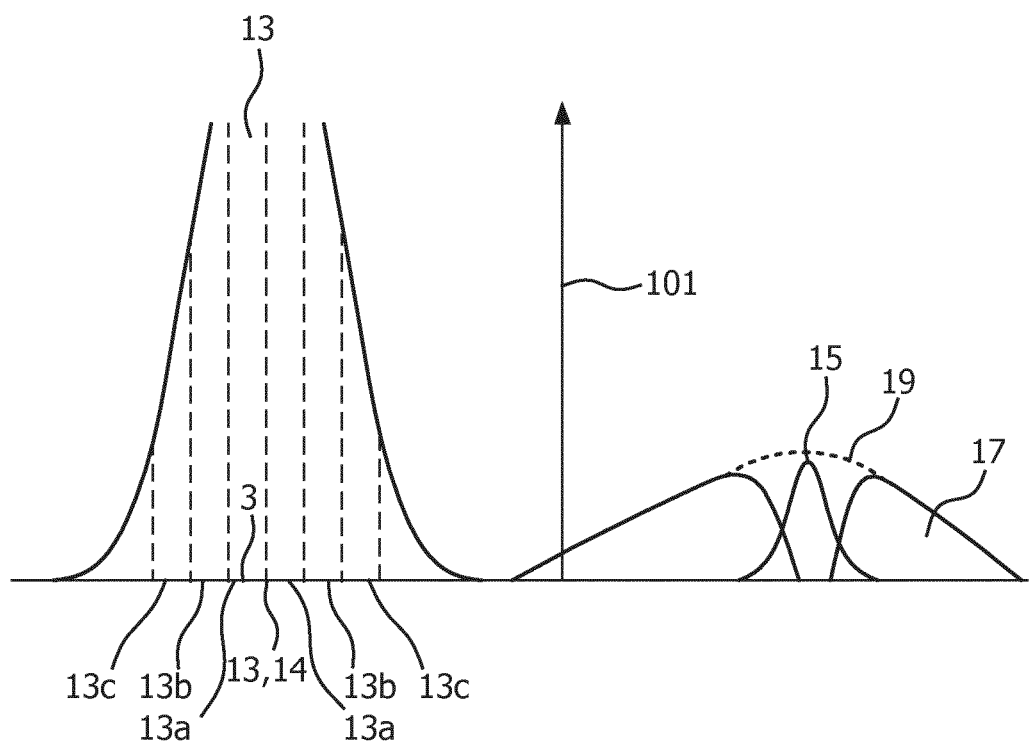
FIG. 14 schematically depicts luminous output generated with a lighting device according to yet a further embodiment configured to mask such optical artefacts.

In the above embodiment, the background illumination 17 extends over the full angular range of the lighting device 1, i.e. all light sources 11 apart from the light sources 11 that when addressed by the controller 20 would cause the location of the ghost image 15 to be at least partially illuminated are addressed by the controller 20 in order to generate either the spotlight 13 or the background illumination 17. However, in an alternative embodiment schematically depicted in FIG. 14, the background illumination 17 is limited to an area centred around the location of the ghost image 15, in which the luminance of the combination of the background illumination 17 and the ghost image 15 gradually decreases in the radial direction away from the centre of the ghost image 15. This gradual reduction in luminous intensity effectively results in a combined light effect with the reduced spatial contrast with respect to the background, i.e. the surface 3, thereby obscuring the ghost image 15. Furthermore it is shown in FIG. 14 that a peak intensity in lumen output of 100% is obtained from a selected set of LEDs for generating the light spot. The LEDs around the selected set of LEDs operate at a dimming level, i.e. the LEDs in the selected direction and in the trailing direction, which dimming level gradually increases in a radial direction away from the centre 14 of said selected set, in particular, a first partial ring of LEDs directly adjacent to said selected set of LEDs operates at a dim level resulting in an area 13a having a lumen output of about 30%, a second partial ring of LEDs operates at a more dimmed level resulting in an area 13b having a lumen output of about 10%, and a third partial ring of LEDs operates at an even more dimmed level resulting in an area 13c having a lumen output of about 3% in the projected light spot.

In a more advanced embodiment, an interconnected system of multiple lighting device 1 may be coupled to or may comprise an optical feedback device such as a camera or the like arranged to observe the surface 3 onto which the light spot 13 is to be projected. The controllers 20 in this embodiment may be adapted to evaluate the image obtained with the optical feedback device in order to determine the location and intensity of the ghost image 15 on the surface 3 resulting from the generation of a spotlight 13 with one of the lighting devices 1. This for example may be utilized to generate the background illumination 17 with at least some of the other lighting devices 1, which has the advantage of improved control over the intensity of the background illumination 17, in particular minimizing the intensity of this background illumination 17, which may be difficult to achieve when generating the background illumination 17 with the lighting device 1 responsible for the generation of the ghost image 15 due to the overlap between spots of neighbouring light sources 11 within the array of light sources 11 of a single lighting device 1.

The controller 20 may be adapted to continuously generate the background illumination 17 or alternatively may be adapted to generate the background illumination 17 in response to a user instruction for moving the spotlight 13, as during such movement the presence of the ghost image 15 becomes more conspicuous. To this end, the controller 24 example may smoothly increase the background illumination level from 0 to a desired luminance upon the controller 20 receiving the user instruction and smoothly (gradually) decrease (dim) the luminance back to 0 upon the spotlight 13 being moved to its new location as specified by the received user instruction.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A lighting device for generating a dynamically adjustable spotlight, comprising:
   a planar array of individually addressable sets of light sources, each set comprising at least one light source, each of said light sources being arranged to produce a luminous distribution;
   a controller arranged to individually address said sets of light sources; and
   an optical system comprising a plurality of refractive lenses common to the individually addressable light sources and sequentially arranged along a common optical axis to shape the luminous distribution of each set of light sources into a spotlight and project said spotlight in an angular direction that is a function of a position of said set in the array, wherein the optical system is arranged to change the respective angular directions of projected moving spotlights generated from luminous distributions of different neighboring light sources in a constant manner;
   wherein the plurality of refractive lenses comprises a first refractive lens arranged to receive the respective luminous outputs from the array and at least one further refractive lens arranged to receive a luminous output of the first refractive lens, said first refractive lens having a lens body at least partially delimited by a planar surface facing the array and a convex surface opposite the planar surface, said lens body having a maximum height (H1) normal to the planar surface of at least a radius (r1) of the planar surface;
   wherein at least one of a respective optical surfaces of the first refractive lens and the at least one further refractive lens is at least partially structured to diffuse said luminous distributions; and
   wherein the at least one further refractive lens comprises a double-convex refractive lens having a first convex surface facing the first refractive lens and a second convex surface opposite the first convex surface.

2. The lighting device of claim 1, wherein during operation of the lighting device a selected set of light sources for generating light spot has adjacent light sources centered around said selected set operating at a dimming level of which the dimming level gradually increases in a radial direction away from the center of said selected set.

3. The lighting device of claim 2, wherein the first refractive lens has a first diameter and the at least one further refractive lens has a second diameter larger than the first diameter, the first diameter being larger than a diameter of the array.

4. The lighting device of claim 1, wherein the at least one further refractive lens comprises a first further refractive lens and a second further refractive lens arranged such that the first further refractive lens is positioned in between the first refractive lens and the second further refractive lens, each of the first further refractive lens and the second further refractive lens being a plano-convex lens having its planar surface facing the array.

5. The lighting device of claim 4, wherein the optical system further comprises a diffuser arranged downstream from the first refractive lens.

6. The lighting device of claim 1, wherein a maximum height (H2) of the first convex surface is smaller than a maximum height (H3) of the second convex surface.

7. The lighting device of claim 1, wherein the maximum height (H1) normal to the planar surface is 1.1 to 1.3 times the radius (r1) of the planar surface.

8. The lighting device of claim 1, wherein the controller is adapted to calculate a location and luminance of a ghost image of a selected set of light sources for generating a spotlight and to control further sets of light sources of the array to generate a region of background illumination for said spotlight enveloping the ghost image such that the combination of the region and the ghost image has a defined luminance.

9. The lighting device of claim 8, wherein the defined luminance is a constant luminance or a radially decreasing luminance in a direction away from the ghost image.

10. The lighting device of claim 1, further comprising at least one of a user interface and a wireless communication module to which the controller is responsive.

11. A lighting device for generating a dynamically adjustable spotlight, comprising:
    a planar array of individually addressable sets of light sources, each set comprising at least one light source, each of said light sources being arranged to produce a luminous distribution;
    a controller arranged to individually address said sets of light sources; and
    an optical system comprising a plurality of refractive lenses common to the individually addressable light sources and sequentially arranged along a common optical axis to shape the luminous distribution of each set of light sources into a spotlight and project said spotlight in an angular direction that is a function of a position of said set in the array, wherein the optical system is arranged to change the respective angular directions of projected moving spotlights generated from luminous distributions of different neighboring light sources in a constant manner;
    wherein the plurality of refractive lenses comprises a first refractive lens arranged to receive the respective luminous outputs from the array and at least one further refractive lens arranged to receive a luminous output of the first refractive lens, said first refractive lens having a lens body at least partially delimited by a planar surface facing the array and a convex surface opposite the planar surface, said lens body having a maximum height (H1) normal to the planar surface of at least a radius (r1) of the planar surface;

wherein at least one of a respective optical surfaces of the first refractive lens and the at least one further refractive lens is at least partially structured to diffuse said luminous distributions;

wherein during operation of the lighting device a selected set of light sources for generating light spot has adjacent light sources centered around said selected set operating at a dimming level of which the dimming level gradually increases in a radial direction away from the center of said selected set; and wherein at least some of the respective optical surfaces of the first refractive lens and the at least one further refractive lens are coated with an anti-reflective coating.

12. The lighting device of claim 11, wherein at least a central portion of the convex surface of the first refractive lens is covered with the anti-reflective coating, said central portion covering at least 50% of the convex surface.

* * * * *